United States Patent [19]

Steele et al.

[11] Patent Number: 5,302,428
[45] Date of Patent: Apr. 12, 1994

[54] MULTI-LAYER WRAPAROUND HEAT SHRINK SLEEVE

[75] Inventors: Robert E. Steele, Richmond Hill; Alfredo Andrenacci, Toronto, both of Canada

[73] Assignee: Shaw Industries Ltd., Rexdale

[21] Appl. No.: 953,087

[22] Filed: Sep. 29, 1992

[51] Int. Cl.$^5$ .......................... B65D 65/02; B32B 7/00
[52] U.S. Cl. ............................. 428/34.9; 428/35.1; 428/35.2; 428/35.3; 428/36.4; 428/58; 428/200; 428/347; 428/349; 174/DIG. 8; 138/170; 138/174; 138/128
[58] Field of Search ............... 174/DIG. 8, 428/34.9, 428/35.1, 349, 192, 36.4, 35.2, 35.3, 57, 58, 913, 347, 200; 138/150, 170, 128, 174

[56] References Cited

U.S. PATENT DOCUMENTS

| | | | |
|---|---|---|---|
| 3,415,287 | 12/1968 | Heslop et al. | 174/DIG. 8 |
| 3,770,556 | 11/1973 | Evans et al. | 161/39 |
| 4,200,676 | 4/1980 | Caponigro et al. | 428/57 |
| 4,472,468 | 9/1984 | Tailor et al. | 428/57 |
| 4,598,165 | 7/1986 | Tsai | 174/DIG. 8 |
| 4,732,412 | 3/1988 | VanDerLinden et al. | 285/47 |
| 4,738,883 | 4/1988 | Young | 428/36 |
| 4,802,509 | 2/1989 | Brandolf | 138/110 |
| 4,896,904 | 1/1990 | Gadsden et al. | 174/DIG. 8 |
| 4,906,427 | 3/1990 | Van Loo et al. | 264/229 |
| 5,134,000 | 7/1992 | Smythe et al. | 428/35.1 |
| 5,188,883 | 2/1993 | Rawlyk | 428/349 |

Primary Examiner—Ellis P. Robinson
Assistant Examiner—Rena L. Dye
Attorney, Agent, or Firm—Ridout & Maybee

[57] ABSTRACT

A multiple layer wraparound sleeve having a heat shrinkable backing layer and at least one functional layer has the functional layer as a discrete sheet which is connected to one end of the backing layer, and is of at least sufficient length that, when the sleeve is wrapped around the pipe or other substrate at least twice, the functional layer sheet wraps around the substrate first with its ends overlapping and the backing layer wraps around the functional layer sheet with its ends overlapping. This allows wrappings of reduced thickness to be employed without problems of voids occurring between the functional layer and the substrate.

13 Claims, 4 Drawing Sheets

MULTI-LAYER WRAPAROUND HEAT SHRINK SLEEVE

BACKGROUND OF THE INVENTION

Multiple layer wraparound heat shrinkable sleeves have been used for many years for sealing and protecting pipes, cables and the like. Such sleeves consist usually of a layer of crosslinked plastic sheet which is dimensionally heat unstable in one direction, on top of which is coated or laminated one or more layers of functional material. The direction of shrinkage is such that, when the sleeve is wrapped around an article, such as a pipe joint or a cable, the sleeve will, upon heating, decrease in circumference in relation to said object until it conforms tightly to the shape and profile of said object. By "functional material" is meant, as will be understood by those skilled in the art, a material which performs a function which the heat unstable sheet cannot adequately perform on its own. Most commonly a single functional material layer is used, and consists of a heat-activable polymer composition, such as a hot melt adhesive or a mastic sealant. The term "heat activable" refers to the fact that, upon heating to a moderate temperature a beneficial change in properties occurs, which will promote the function of said layer. In the case of a so-called "hot melt adhesive", the functional layer converts from what is essentially a solid, non-tacky state to what is essentially a fluid, tacky state, thus allowing it to fill in surface irregularities and form an adequate bond to the surface. In the case of a so-called "mastic sealant", the functional layer is converted from a soft gummy material which does not readily flow under the influence of gravity, to a flowable liquid which will fill in surface irregularities. Upon cooling, both types of functional material layer revert to the state they were in prior to heating. By "moderate temperatures" is meant a temperature which is not so high as to deteriorate the heat shrinkable layer, the functional material layer itself, or the substrate upon which the sleeve is being applied. Of course other types of functional material layers may be used, such as materials which crosslink at the shrinkage temperature, materials which are electrically conductive, and the like.

The heat shrinkable layer is most usually a sheet of olefinic polymer, such as polyethylene or a copolymer thereof, which has been crosslinked to render it non-melting and subsequently stretched and cooled in the stretched condition. If the temperature of the sheet is subsequently raised to or above the crystalline melting temperature of the main component material, the sheet will recover to the dimensions which it had prior to stretching.

While the design wherein the multiple layers are laminated on top of one another has provided acceptable products for many applications, it also has certain disadvantages. This is illustrated in FIGS. 1 and 2 wherein is shown a known form of wraparound sleeve 11 comprising a longitudinally heat-shrinkable backing 12, a layer of heat activable sealant or mastic 13 coated thereon, a bare area 14 and a stripe of hold down adhesive 16, as known from, for example Tailor et al U.S. Pat. No. 4,472,468. In use the sleeve 11 is wrapped around a pipe 17 and heat is applied firstly to weld an overlap end 12a of the backing at the bare area 14 to an underlap end 12b and secondly to make the layer 13 flowable and shrink down the backing 12 so that hoop stress compresses the flowable layer 13 tightly onto the surface of the pipe 17. One particular problem is that where the sleeve 11 overlaps itself there is a void 18 which must fill up during installation if a proper seal is to be achieved. This void is equal in thickness to the total thickness of the layers 12 and 13 of the laminated sleeve, as shown in FIG. 1. If absolutely no extra sealant 13 flows in to this void, it cannot be completely filled. A proper seal requires that additional sealant 13 move into the area where the void 18 had been. The higher the viscosity of the sealant 13, the more difficult this is to achieve. The presence of the heat shrinkable component 12b within this overlap region also makes it more difficult. For one thing, the heat shrinkable component 12b will not melt or flow. For another thing, the heat shrinkable layer 12 is free to recover fully in this area, with a corresponding increase in thickness which exacerbates the problem.

Commercially available systems most typically address the underlap void problem by using a sealant layer 13 which is at least as thick, and preferably at least 1.5 times as thick as the stretched heat shrinkable layer 12. Further, the sealants are most preferably formulated to give a very low viscosity at the temperatures obtained during installation. The former approach results in sleeves which are often much thicker than would otherwise be required, which means that they are more expensive, and require more heating and more time to shrink down than would otherwise be required. The latter approach limits the formulation of the sealants, confining them to relatively low molecular weights with correspondingly limited physical properties.

Another limitation of the known sleeves is that the layers must be capable of being laminated such that they will not delaminate when the sleeve is rolled or unrolled. This obviously requires that the two layers adhere to one another, but additionally this adhesion must be developed at processing temperatures which will not cause the sheet to shrink. These limitations make it difficult to apply layers of functional material which must be processed at very high temperatures, and generally limit the choices to those which form a good bond to the heat shrinkable backing.

SUMMARY OF THE INVENTION

The present invention relates to a sleeve which overcomes the above described problems, and also permits the preparation of sleeves incorporating layers which are not possible or practical with laminated designs.

The present invention provides a wraparound sleeve which is heat shrinkable in a longitudinal direction and has connected to one longitudinal end portion at least one auxiliary sheet comprising a functional material. The auxiliary sheet is of length at least sufficient to encircle the article and overlap itself so that the auxiliary sheet can be wrapped around the article with its ends overlapped and the heat shrinkable sheet then wrapped around the auxiliary sheet with its end portions overlapping.

BRIEF DESCRIPTION OF THE DRAWINGS

The invention will be more fully described, by way of example only, with reference to the accompanying drawings, in which.

DETAILED DESCRIPTION OF THE PREFERRED EMBODIMENTS

Figure 1:
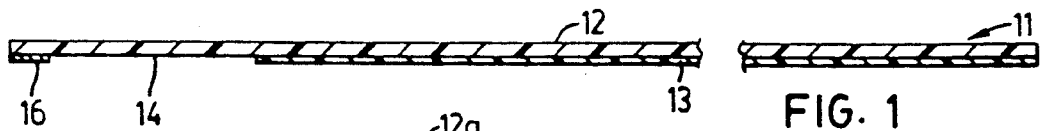
FIG. 1 shows a longitudinal section through a known form of multiple layer wraparound sleeve.
Figure 2:
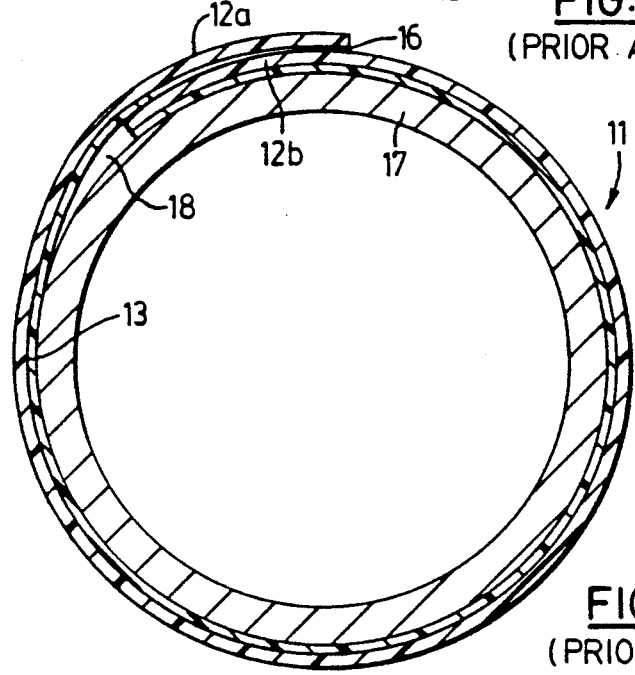
FIG. 2 shows a transverse section through a pipe having the sleeve of FIG. 1 wrapped around it.
Figure 3:
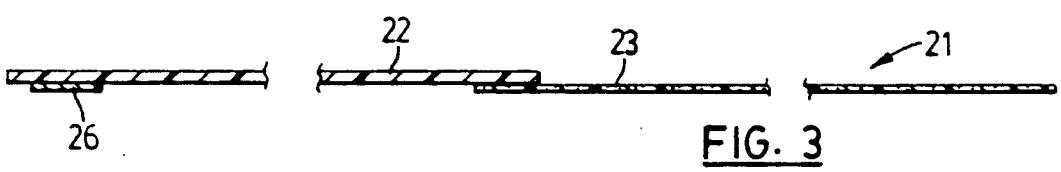
FIG. 3 shows a longitudinal section through one form a multiple layer wraparound sleeve according to the invention.
Figure 4:
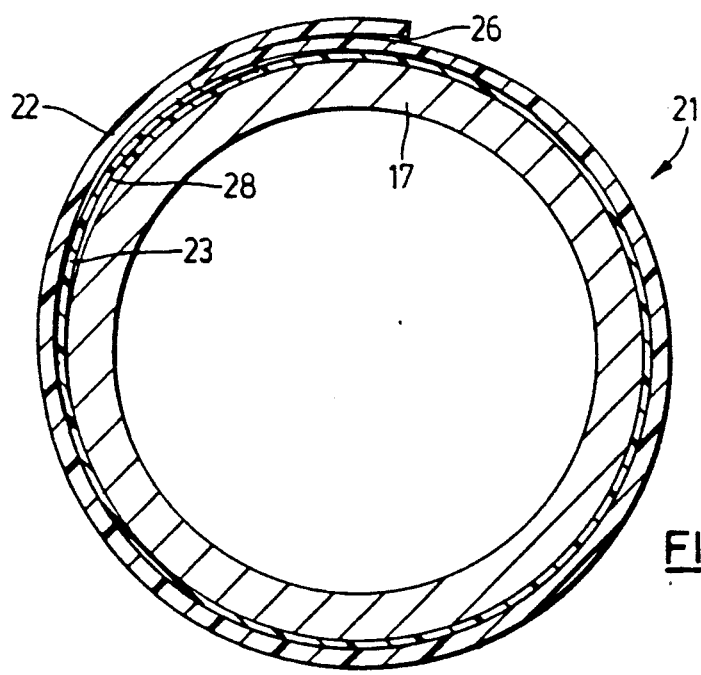
FIGS. 4 and 5 show the sleeve of FIG. 3 wrapped around a pipe before and after heating, respectively.

Referring to the drawings a two layer sleeve 21 in accordance with the invention is shown in FIGS. 3 and 4. As shown, one end of a longitudinal heat shrinkable backing sheet 22 is connected to one end of an auxiliary sheet 23 of functional material which will form the inner layer when applied to a substrate such as a pipe 17. The means of connection of the sheets 22 and 23 is not particularly critical, provided such connection is sufficiently strong that it will not come apart during normal handling and installation. The sheet 22 may be provided with a transverse stripe of hold-down adhesive 26. To install the sleeve 21, it is wrapped around the substrate 17 with the functional layer 23 against said substrate 17. In this case, the sleeve 21 encircles the object 17 at least twice, such that the layer 23 overlaps itself to some degree, and the heat-shrinkable layer 22 does likewise with its overlapping ends in direct contact with one another. This is illustrated in FIG. 4. Usually, the auxiliary sheet 23 is at least equal in length to the heat shrinkable sheet 22. In comparison with the known laminated sleeve of FIGS. 1 and 2, the following important and beneficial differences exist:

1. The void 28 at the surface of the substrate 17 is only as thick as the functional layer 23, whereas it is as thick as the total sleeve thickness with the known sleeve of FIGS. 1 and 2.

2. The void 28 at the surface of the substrate 17 is bounded on one side by a double thickness of heat activable functional layer 23, and on the other side by a single layer of that material.

3. There is no unrestricted section of heat shrinkable backing 22 within the underlap area adjacent the surface of the substrate 17.

Figure 5:
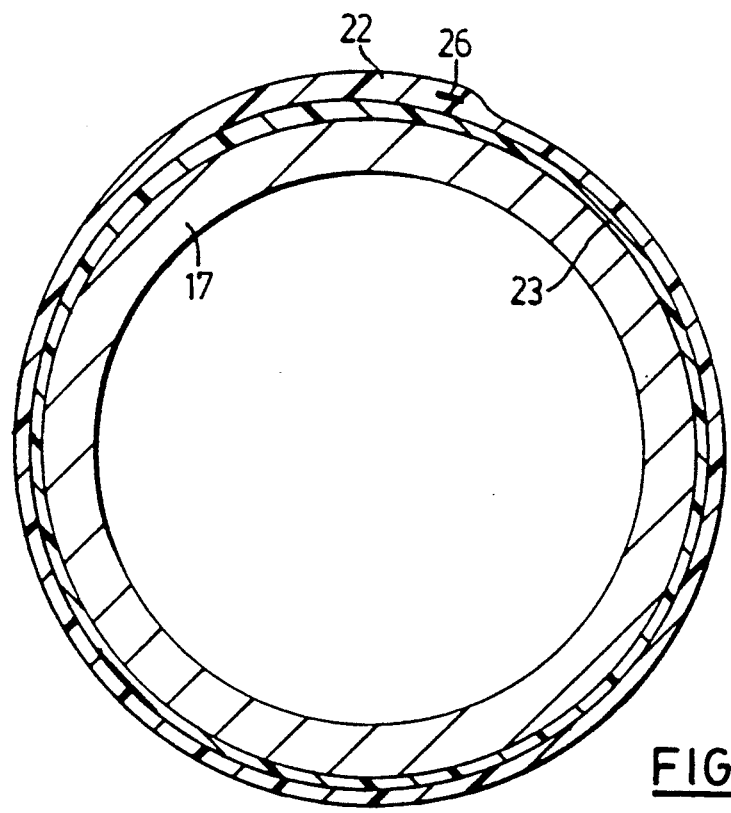

The benefit of having a much smaller void than that formed with a conventional design is further enhanced by the fact that there is proportionally a greater quantity of flowable material in the vicinity, and this is all being compressed during installation by the heat shrinkable outer layer 22. The lack of an unrestricted section of heat shrinkable sheet 22 within the underlap region eliminates the negative effect which occurs when such section shrinks and becomes thicker. Under the hoop stresses generated by the heat shrinkable outer layer 22, the heat activable material 23 within the underlap region is readily forced into the void, expelling the air and resulting in a complete seal as illustrated in FIG. 5. As seen in FIG. 5 the activable material 23 forms a continuous layer on the surface of the pipe 17. The overlapping and directly contacting ends of the outer layer 22 have fused together and the layer 22 has shrunk in the conventional manner.

The layer 23 can be relatively thin and the thickness of the applied sleeves as a whole may be much less than in known sleeves. This reduces the amount and duration of heating required for installation and the installed sleeve may have a lower profile and be less subject to soil stresses than known sleeves.

Figure 7:
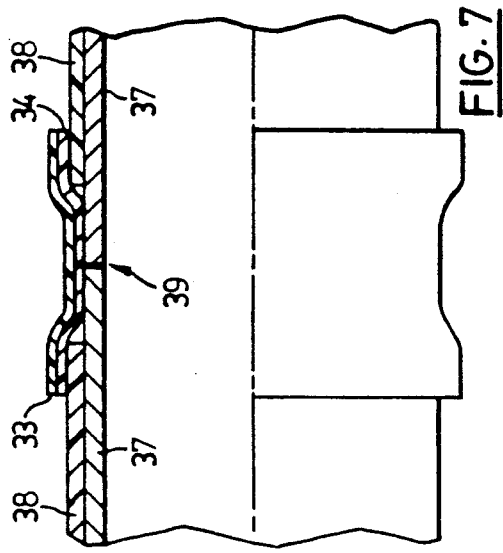
FIG. 7 shows a side view partly in longitudinal section through a welded pipe joint to which a sleeve as shown in FIG. 6 has been applied and the outermost layer has subsequently been stripped off.
Figure 6:
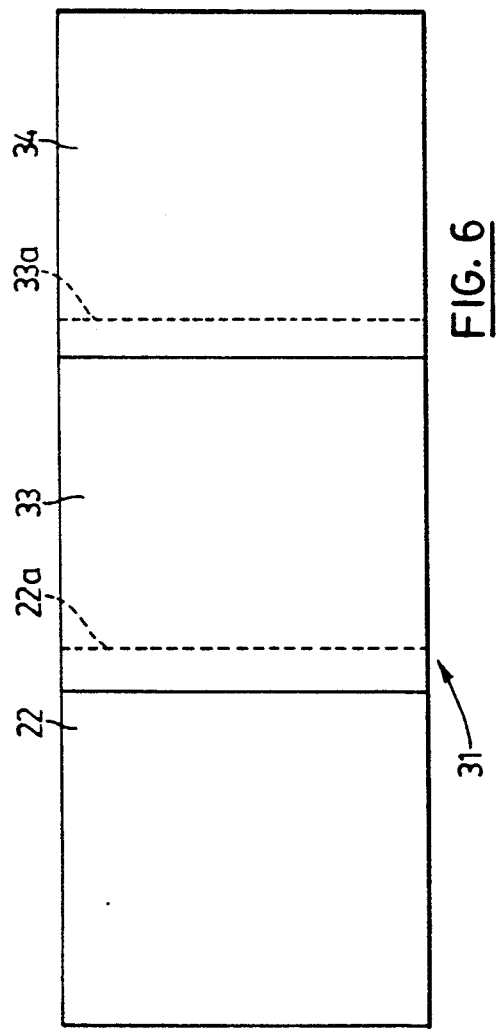
FIG. 6 shows a view from one side of a further embodiment of a wraparound sleeve in accordance with the invention.

In addition to the benefits achieved with respect to sealing, the multi-wrap sleeve of the present invention can be used to generate coverings not possible with conventional laminated designs if more than one auxiliary sheet is used. A three component sleeve 31 is illustrated in FIG. 6 comprising an outer longitudinally heat shrinkable sheet 22, a first auxiliary sheet 33 connected to one longitudinal end of the sheet 22 and of length and heat equal to the sheet 22, and a second auxiliary sheet 34 connected to the opposite of the sheet 33 and of length at least equal to the sheet 22. The broken lines 22a and 33a indicate end edges of the sheets 22 and 33, respectively. In this example, there are two functional layers. The innermost layer 34 in use is in direct contact with the pipe or other substrate, and may typically act as a sealing or adhesive layer, or in use it may at least conform to irregularities of the surface of the substrate. The intermediate layer 33 may have a variety of functions, such as providing adhesion between the innermost and outermost layers 34 and 22 if they are not directly compatible, providing cushioning, resistance to penetration, resistance to gas or water transport, or other such functions. In one advantageous form, the outermost layer 22 is a crosslinked heat shrinkable polyolefin and the intermediate layer 33 is an uncrosslinked polymer which has been oriented to provide heat shrinkability. Examples of such materials would be polypropylene, thermoplastic polyester, thermoplastic polyurethane, thermoplastic rubbers, polyamides (such as nylon 11, nylon 12, etc.), polybutylene, etc. When such a system is wrapped around a substrate and heat is applied, the whole mass will shrink and the intermediate layer 33 fuses where it overlaps itself. After cooling, the outermost layer 22 may be removed to leave a covering consisting of a layer of plastic which is not normally useable as a heat shrinkable sleeve bonded to the substrate by the innermost layer 34. This approach expands enormously the number of polymers which can be incorporated as heat shrinkable systems. FIG. 7 shows, for example a welded joint between two pipe sections 37 each having a protective resinous outer coating 38. After winding the sleeve 31 around the exposed weld area 39, heat is applied to shrink down the outer layer 22, fuse the intermediate layer 33 to form an endless band shrunk down tightly against the weld area 39, and fuse the sealant or adhesive layer 34 to form a continuous protective coating over the area 39. The outer layer 22 diffuses heat locally applied to its exterior, for example by application of a propane torch or the like, and which would otherwise tend to melt a hole in the layer 33. After the shrunk-down sleeve 31 has cooled, a cut is made through the outer layer 22, which is non-adherent to and strippable from the intermediate layer 33. The layer 22 is then stripped off, leaving the protective wraparound sleeve structure shown in FIG. 7.

A further preferred form of the sleeve 31 has layers 22, 33 and 34 with differing electrical characteristics. The innermost layer 34 comprises a conventional stress control material which modifies lines of electric field, for example, the layer 34 may deflect or moderate lines of electric field. The intermediate layer 33 is a conventional non-crosslinked electrically insulative polymeric material. For example it may have a very high electrical resistance and a very low dielectric constant. The outermost layer 22 comprises a conventional crosslinked semi-conductive composition. Such composition is capable of providing an outer screen on a high voltage cable construction. The sleeve 31 is applicable for high voltage splices.

In a further advantageous form, the auxiliary sheet 23, or one or both of the auxiliary and further auxiliary sheets 33 and 34 comprise a mesh of reinforcing fibres. Such sheet may consist of a length of a conventional woven mesh, for example a mesh of reinforcing glass fibres, or the sheet may comprise a layer of woven mesh encapsulated by or laminated to a flowable polymer sheet.

Figure 8:
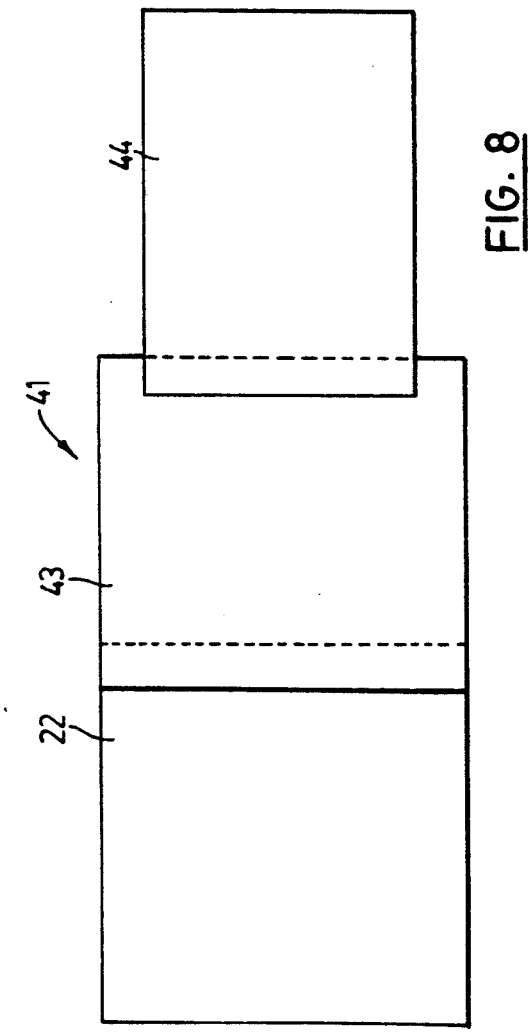
FIG. 8 shows a view from one side of a still further embodiment of a sleeve in accordance with the invention.
Figure 9:
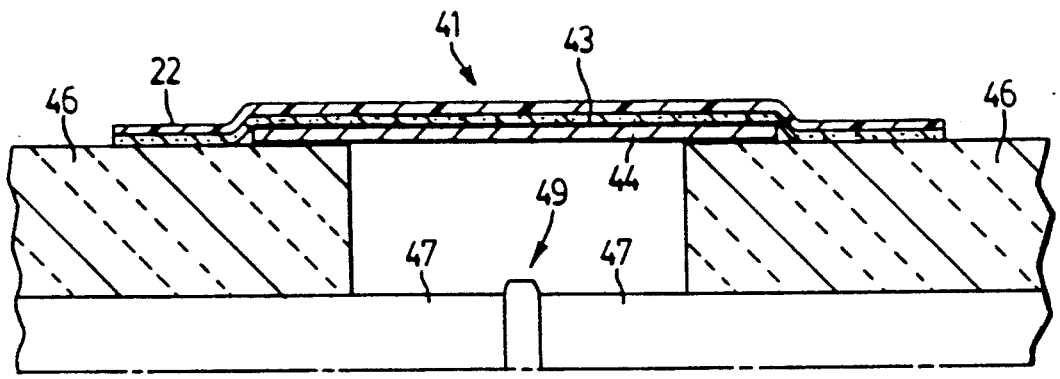
FIG. 9 shows a side view partly in longitudinal section of an upper half of an insulated pipe joint to which the sleeve of FIG. 8 is applied.

The various layers of the sleeve may be the same width or of differing widths to suit the desired configuration for the final covering. For example, FIG. 8 shows a covering 41 for enclosing the weld joint of an insulated pipeline comprising an outer longitudinally heat shrinkable layer 22, an intermediate heat activable adhesive or sealant layer 43, preferably a high shear hot melt adhesive, connected thereto, and a narrow thin flexible metal sheet 44 connected to the sheet 43. In use, as seen in FIG. 9, the sleeve 41 is applied to a joint area 49 between two pipe line sections 47 having an outer casing 46 of greater diameter with insulation in the annulus between the casing 46 and the pipe 47. The sleeve 41 is wrapped around the pipe joint with the metal layer 44 directly against the surface of the casing 46. Upon application of heat, the outer layer 22 shrinks down the adhesive 43 melts and forms a seal to the outer casing 46 and to the metal sheet 44. The space within the wrapped around metal sheet 44 may then be filled with insulation injected through an opening formed in the sheet 44.

Figure 10:
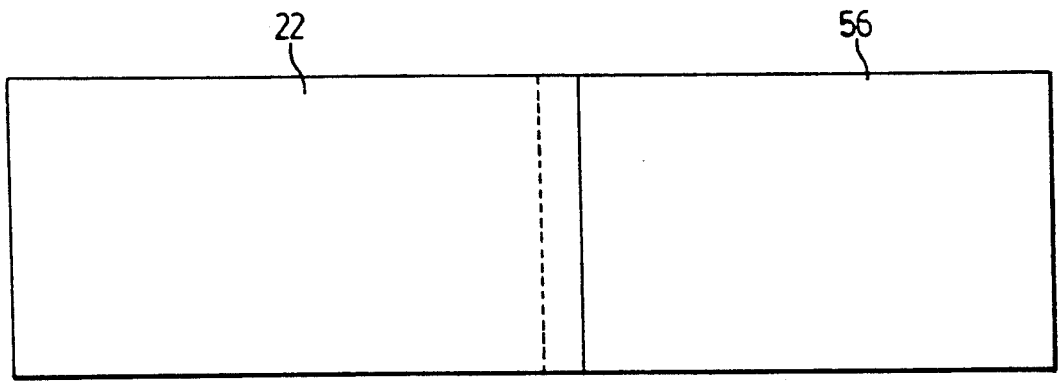
FIGS. 10 and 11 show a plan view and a longitudinal section respectively through yet a further embodiment of a sleeve in accordance with the invention.
Figure 11:
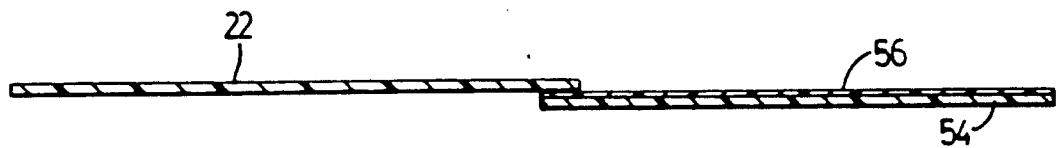

The individual layers which make up the sleeve of the invention may themselves be laminated multiple layers. For example, as seen in FIGS. 10 and 11, if the composition of the innermost layer 54 is such that it cannot support itself, it may be laminated to a very thin carrier sheet 56, such as a film of polyester, polyethylene or the like. In such a case, the carrier film 56 is bonded to the next outer layer 22 such that it faces away from the substrate when installed.

The invention is particularly advantageous when the innermost layer is a very high viscosity polymer which can itself be extruded into a sheet or film. It is possible to simply join a sheet of such material in whatever thickness is desired to a sheet of heat shrinkable crosslinked polymer without regard to relative thickness and without concern about causing the heat shrinkable crosslinked sheet to recover, as would be the case if the two layers were joined by extrusion laminating. Because a much thinner layer of adhesive can be used, it is much easier to heat through to the interface with the substrate without burning or scorching the sleeve surface. The invention is also particularly suited to producing heat shrinkable coverings in which a very thick outer layer is required, such as for enhanced resistance to impact or other mechanical damage.

A variety of methods may be used to join the various layers together. The sheets may be welded or heat sealed together using a conventional heat sealer, ultrasonic welder, high frequency induction welder, heated wedge welder, or the like. Alternatively, the sheets may be glued together with, for example, contact adhesive, dual sided adhesive tape, or any like means capable of forming a strong enough bond to maintain the configuration intact during manufacture, handling, and installation.

Instead of or in addition to using hold-down adhesive to retain the overlapped ends of the outer layer 22 together, the free end of the layer 22 opposite the auxiliary sheet may be provided with a weld-on closure flap as described for example in commonly-assigned Smythe et al U.S. Pat. No. 5,134,000 dated Jul. 28, 1992 and Steele et al patent application Ser. No. 07/660,866 filed Feb. 26, 1991. Alternatively a welded-on closure sheet may be employed to unite the overlapped ends of the sheet 22 before shrinking, as described in Steele et al Ser. No. 07/694,479 filed May 2, 1991.

Alternatively, instead of welding or fusion bonding the overlapped ends of the sheet 22, the ends may be bonded together by an adhesive patch applied over them before shrinking as described for example in Caponigro et al U.S. Pat. No. 4,200,676.

Examples of suitable materials or compositions for the hold-down adhesive, for the heat shrinkable outer layer, and for the adhesive, sealant or other functional layers are well-known to those skilled in the art and are described in more detail in the following commonly-assigned U.S. patents and applications, all of which are incorporated by reference herein: U.S. Pat. No. 4,472,468 (Tailor et al); U.S. Pat. No. 5,134,000 (Smythe et al); 07/660,866 and 07/694,479.

The above description provides ample information for one skilled in the art to make and use the sleeves in accordance with the invention. For the avoidance of doubt, however, some detailed Examples will be given.

EXAMPLE 1

Plexar PXTR015, which is a copolymer of polyethylene having adhesive properties, was extruded into a sheet having a thickness of 0.2 mm. A composition consisting of 40 parts low density polyethylene and 60 parts of linear low density polyethylene was likewise extruded into a sheet having a thickness of 1.0 mm, and crosslinked by exposure to high energy electrons to give a cure of 60%, as determined by extraction by boiling dekalin. This was subsequently heated to 135° C., stretched to 1.3 times its original length, and cooled to ambient temperature while in the stretched state. A 355 mm long strip of the adhesive copolymer sheet was bonded to a 355 mm long strip of the heat shrinkable crosslinked sheet using an ultrasonic welder to give a configuration like that shown in FIG. 3. The sleeve was then wrapped around a 88.9 mm diameter pipe coated with a bonded polyethylene such that the adhesive layer was on the inside, and the outside end was fastened in place with a piece of two-sided adhesive tape. The sleeve was shrunk with a propane torch and allowed to cool. Subsequent inspection revealed that there was no void at the pipe surface where the adhesive layer had overlapped itself, the inner and outer layers were securely bonded, and the sleeve was securely bonded to the pipe coating.

COMPARATIVE EXAMPLE 1

The two different sheet materials referred to in Example 1 were placed on top of one another, wrapped around an 88.9 mm diameter polyethylene-coated pipe with the adhesive layer in, and heated with a torch. After cooling, the inner and outer layers of the sleeve were bonded, but there was a large void at the surface of the pipe where the sleeve had overlapped itself.

EXAMPLE 2

Sheets of plastic, 0.21 mm thick, were extruded from Kestron polypropylene adhesive terpolymer resin and from Hifax polypropylene copolymer resin. 355 mm long strips of each were cut and joined together at the end, using an ultrasonic welder, and this assembly was subsequently bonded to a 355 mm long strip of the heat shrinkable crosslinked sheet described in Example 1. This was installed over an epoxy powder coated 88.9 mm diameter pipe by wrapping it three times around with the adhesive layer against the surface of the pipe, then shrinking it with a propane torch. The pipe was then heated with an induction heater to 180° C., and allowed to cool. The result was an excellent bond between the pipe and the adhesive, and between the adhesive and the polypropylene layer, but no adhesion between the polypropylene and the outer layer of heat shrinkable polyethylene. This outer layer was easily removed to leave a 0.21 mm thick covering of polypropylene bonded to the pipe coating by the polypropylene adhesive, with no channels or voids along the interface between the substrate and the adhesive.

We claim:

1. A multiple layer wraparound heat shrinkable sleeve comprising a sheet of dimensionally heat unstable flexible material having longitudinally spaced end portions capable of being brought into overlapping relation when said sheet is applied to an article in wrapping relation thereto, the material of said sheet being crosslinked and weldable to itself and having been stretched in the longitudinal direction from an originally heat stable form to a dimensionally heat unstable form capable of moving in the direction of its original form by the application of heat alone, one of said end portions having connected thereon at least one flexible auxiliary sheet comprising a functional material and of length at least sufficient to encircle the article and the other of said end portions having an exposed portion directly overlapping on and weldable to said one end portion when the auxiliary sheet is wrapped around the article with its end portions overlapping and the dimensionally heat unstable sheet is wrapped over the auxiliary sheet with its end portions overlapping.

2. A sleeve as claimed in claim 1 wherein the auxiliary sheet comprises a sheet of heat activable a sealant or adhesive.

3. A sleeve as claimed in claim 2 wherein said sheet of sealant or adhesive is a self supporting film.

4. A sleeve as claimed in claim 2 wherein said sheet of heat activable sealant or adhesive is laminated to a carrier sheet.

5. A sleeve as claimed in claim 1 comprising a further flexible auxiliary sheet connected on an end of the first mentioned auxiliary sheet opposite the dimensionally unstable sheet and of length at least sufficient to encircle said article and overlap, whereby a three-layer wrapping may be formed.

6. A sleeve as claimed in claim 5 wherein said first mentioned auxiliary sheet comprises a longitudinally heat shrinkable and fusible sheet and said further auxiliary sheet comprises a heat activable sealant or adhesive.

7. A sleeve as claimed in claim 6 wherein said sheet of dimensionally heat unstable material is non-adherent to and is strippable from said fusible sheet.

8. A sleeve as claimed in claim 5 wherein said first mentioned auxiliary sheet comprises a sealant or adhesive and said further auxiliary sheet comprises a flexible metal sheet.

9. A sleeve as claimed in claim 5 wherein said first mentioned auxiliary sheet comprises a non-crosslinked electrically insulative polymeric material, said further flexible auxiliary sheet comprises a non-crosslinked polymeric composition capable of modifying lines of electric field, and said heat shrinkable sheet comprises a crosslinked semi-conductive composition capable of providing an outer screen on a high voltage cable construction.

10. A sleeve as claimed in claim 1 wherein said at least one auxiliary sheet is a different width from said dimensionally heat unstable sheet.

11. A sleeve as claimed in claim 10 wherein said auxiliary sheet is narrower than said dimensionally heat unstable sheet.

12. A sleeve as claimed in claim 1 wherein said at least one auxiliary sheet comprises a mesh of reinforcing fibres.

13. A sleeve as claimed in claim 1 including a hold down adhesive portion on the dimensionally heat unstable sheet adjacent said exposed portion of said other end portion, for initially holding said other end portion overlapped on said one end portion.

* * * * *